US010063156B2

(12) United States Patent
Fong et al.

(10) Patent No.: US 10,063,156 B2
(45) Date of Patent: Aug. 28, 2018

(54) LEAKAGE REDUCTION CIRCUIT

(71) Applicant: Microsoft Technology Licensing, LLC, Redmond, WA (US)

(72) Inventors: Chee Kiong Fong, Cupertino, CA (US); David Richard Perchilk, Redmond, CA (US); Suet Fong Tin, Redmond, WA (US); Michael Donovan Rulien, Auburn, WA (US); Perry Samuel Stultz, Carnation, WA (US); Edward C. Giaimo, III, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 153 days.

(21) Appl. No.: 14/227,119

(22) Filed: Mar. 27, 2014

(65) Prior Publication Data
US 2015/0280587 A1 Oct. 1, 2015

(51) Int. Cl.
*H02M 3/335* (2006.01)
*H02M 3/337* (2006.01)
*H02M 1/12* (2006.01)
*H02M 1/44* (2007.01)

(52) U.S. Cl.
CPC ....... *H02M 3/33546* (2013.01); *H02M 1/126* (2013.01); *H02M 1/44* (2013.01); *H02M 3/335* (2013.01); *H02M 3/337* (2013.01); *H02M 2001/123* (2013.01)

(58) Field of Classification Search
CPC .................................................. H02M 3/335

USPC ................................................. 363/21.04, 52
See application file for complete search history.

(56) References Cited

U.S. PATENT DOCUMENTS

| 5,179,362 A | 1/1993 | Okochi et al. |
|---|---|---|
| 8,643,222 B2 | 2/2014 | Brinlee et al. |
| 9,077,093 B1 * | 7/2015 | Roy ........................ H02K 49/10 |

(Continued)

FOREIGN PATENT DOCUMENTS

KR          900004956          7/1990

OTHER PUBLICATIONS

"Dealing with Common Mode Noise in DC/DC Converters", Retrieved at: <<http://www.calex.com/pdf/8common_noise.pdf>>, Apr. 2001, 4 pages.

(Continued)

*Primary Examiner* — Kyle J Moody
*Assistant Examiner* — Trinh Q Dang

(57) ABSTRACT

A leakage reduction circuit is described herein that is configured to reduce high voltage leakage that may occur in electrical power step-down scenarios. The leakage reduction circuit, for instance, may be employed in a power adapter for a client device, such as a mobile computing device. For example, a power adapter may include a high voltage alternating current (AC) input, and circuitry for converting the AC input into lower voltage direct current (DC) for output to a client device. Implementations of the disclosed leakage reduction circuit include an arrangement of capacitors that provides a noise return path (e.g., for common mode noise) in a power adapter, while reducing high voltage leakage that may occur from a high voltage AC input to a lower voltage DC output of the power adapter.

20 Claims, 4 Drawing Sheets

(56) References Cited

U.S. PATENT DOCUMENTS

| | | | |
|---|---|---|---|
| 2001/0015648 A1* | 8/2001 | Tokita | H02M 1/44 324/628 |
| 2002/0161558 A1* | 10/2002 | Georges | G05B 23/0264 702/189 |
| 2007/0229030 A1* | 10/2007 | Chen | H02J 7/027 320/128 |
| 2007/0247132 A1* | 10/2007 | Iwamoto | H02M 1/44 323/304 |
| 2009/0227122 A1 | 9/2009 | Jubelirer et al. | |
| 2010/0202160 A1* | 8/2010 | Kim | H01F 27/38 363/16 |
| 2011/0280053 A1 | 11/2011 | Halberstadt | |
| 2012/0140527 A1 | 6/2012 | Fong | |
| 2013/0044523 A1* | 2/2013 | Hsiao | H02H 9/04 363/52 |
| 2013/0195497 A1 | 8/2013 | Shimura | |
| 2014/0218981 A1* | 8/2014 | Harada | H02M 1/36 363/49 |

OTHER PUBLICATIONS

"Differential and Common Mode Noise", Retrieved at: <<http://www.murata.com/products/emc/knowhow/pdf/26to30.pdf>>, Mar. 20, 1998, 5 pages.

"EMI/RFI Solutions—Electro-Magnetic Compatibility", Vishay Intertechnology, Inc. Retrieved at: <<http://www.vishay.com/docs/49259/emi_rfi.pdf>> on Mar. 11, 2014, 16 pages.

"Example of Noise Suppression in AC Power Supplies", Retrieved at: <<http://www.murata.com/products/emc/case/household/pdf/k_3.pdf>>, Oct. 8, 2004, pp. 38-46.

"General technical information of (RFI/EMI) Noise suppression capacitors on AC mains", Retrieved at: <<http://www.minuszerodegrees.net/line_supression/capakor_general_technical_information.pdf>> on Mar. 11, 2014, 9 pages.

"Power to VAIO Laptop Ports while Plugged in", Retrieved at: <<http://superuser.com/questions/612685/power-to-vaio-laptop-ports-while-plugged-in>> on Mar. 12, 2014, 3 pages.

"Pulse—Understanding Common Mode Inside", Retrieved at: <<www.pulseelectronics.com/download/3100/g019>> on Mar. 12, 2014, Apr. 1999, 7 pages.

Milind, et al.,' "Selecting Proper Connection Points for Y-Capacitor to Reduce Emi in Smps", In ARPN Journal of Engineering and Applied Sciences, vol. 5, No. 2, Feb. 2010, 6 pages.

"International Search Report and Written Opinion", Application No. PCT/US2015/022107, dated Jun. 15, 2015, 13 Pages.

Sun,"Novel Techniques to Suppress the Common Mode EMI Noise in Class II Off-line SMPS Applications", 2014 IEEE Applied Power Electronics Conference and Exposition, Mar. 16, 2014, 12 Pages.

"Second Written Opinion", Application No. PCT/US2015/022107, dated Feb. 8, 2016, 6 pages.

"International Preliminary Report on Patentability", Application No. PCT/US2015/022107, dated Jun. 13, 2016, 7 pages.

* cited by examiner

LEAKAGE REDUCTION CIRCUIT

BACKGROUND

Mobile computing devices have been developed to increase the functionality that is made available to users in a mobile setting. For example, a user may interact with a mobile phone, tablet computer, or other mobile computing device to check email, surf the web, write texts, interact with applications, and so on. Designing devices with a mobile form factor, however, presents a number of challenges.

For instance, a typical mobile device may operate under battery power (e.g., in a mobile scenario) and may also operate when connected to an external power source, such as an alternating current (AC) socket. Since mobile devices typically operate under direct current (DC) power, AC power from an external power source is usually converted to lower-voltage DC power prior to be supplied to internal components of a mobile device. However, during conversion of AC to DC for mobile device power needs, common mode noise (e.g., from the power supply switching circuit for converting high voltage to low voltage DC) may be coupled into the lower voltage DC output to the mobile device, which can cause touch malfunction in a touch-enabled mobile device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A leakage reduction circuit is described herein that is configured to reduce high voltage leakage that may occur in electrical power step-down scenarios. The leakage reduction circuit, for instance, may be employed in a power adapter for a client device, such as a mobile computing device. An example power adapter may include a high voltage alternating current (AC) input, and circuitry for converting the AC input into lower voltage direct current (DC) for output to a client device. Embodiments of the disclosed leakage reduction circuit include an arrangement of capacitors that provides a noise return path (e.g., for common mode noise) in a power adapter, while reducing high voltage leakage that may occur from a high voltage AC input to a lower voltage DC output of the power adapter. Reducing such high voltage leakage may reduce and/or eliminate physically perceptible electrical current that may be introduced by the high voltage leakage into a connected device, thus reducing the likelihood that a user will feel high voltage leakage when in contact with electrically conductive portions of a connected device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
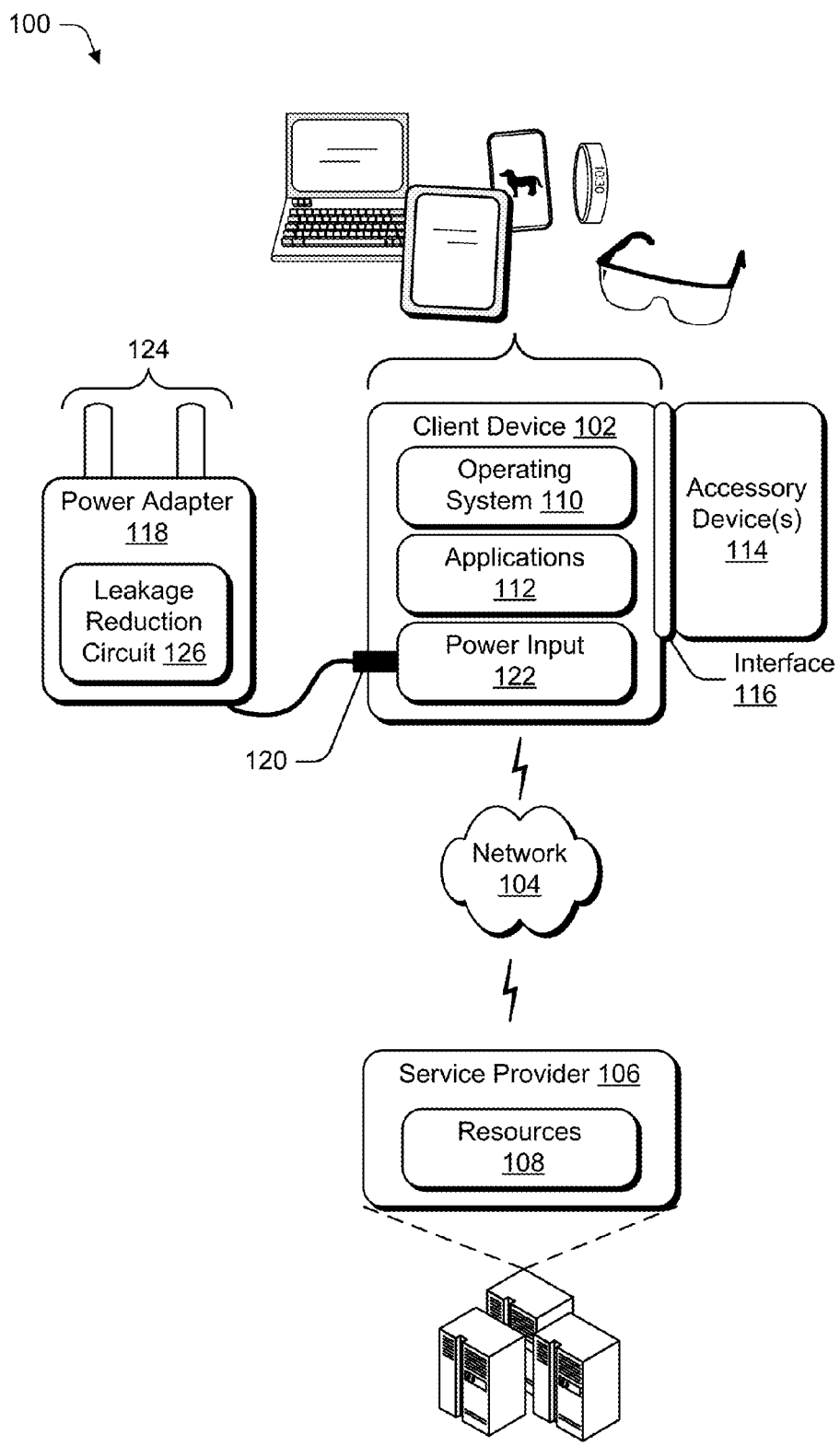
FIG. 1 is an illustration of an environment in accordance with one or more implementations.

One way of reducing common mode noise is to create a common mode noise return path from the low voltage DC circuit ground (secondary ground) of the power supply to the high voltage side ground (primary ground) of the power supply, and to the AC input Line and Neutral using capacitors. Current designs for noise returns paths typically use a capacitor connected between secondary ground to AC Line input, which increases leakage current from the high voltage from primary ground and AC Line input, to the low voltage DC side of the power supply. Other designs may attempt to limit leakage current by reducing capacitors values in a noise return path. Such designs, however, have been shown to be associated with high common mode noise that may cause interference with device componentry, such as resulting in touchscreen malfunction when a power supply is connected to charge a device battery.

In excess, high voltage leakage can have a negative impact on user experience. For instance, high voltage leakage that is passed to a conductive chassis (e.g., a metallic device case) back to the earth ground through a user's body may result in electrical current that is perceptible by the user and thus results in an uncomfortable and unsettling user experience.

A leakage reduction circuit is described herein that is configured to reduce high voltage leakage that may occur in electrical power step-down scenarios. The leakage reduction circuit, for instance, may be employed in a power adapter for a device, such as a mobile computing device. An example power adapter may include a high voltage alternating current (AC) input, and circuitry for converting the AC input into lower voltage direct current (DC) for output to a device. Embodiments of the disclosed leakage reduction circuit include an arrangement of capacitors that provides a noise return path (e.g., for common mode noise) in a power adapter, while reducing high voltage leakage that may occur from a high voltage AC input to a lower voltage DC output of the power adapter. Reducing such high voltage leakage may reduce and/or eliminate physically perceptible electrical current that may be introduced by the high voltage leakage into a connected device.

According to one or more embodiments, the disclosed leakage reduction circuit is operable to provide a noise return path and reduce high voltage leakage in two-prong power adapters, e.g., power adapters that do not include a dedicated ground prong. This enables an economical power adapter to be designed, since a third prong is not required. Further, the two prongs can be foldable into a body of a power adapter when not in use, thus providing a more streamlined profile for storage and travel scenarios. Some regions do not support use of a third prong (e.g., Japan and Korea), and thus a two-prong implementation may be used in more regions than a three-prong adapter plug.

In the following discussion, an example operating environment is first described that may employ the techniques described herein. Next, an example leakage reduction circuit is described in accordance with one or more implementations. Implementation of the circuitry and techniques discussed herein is not limited to the example environment and the example environment is not limited to performance of the example techniques. Lastly, example systems and devices are described that may be employed to implement one or more implementations.

Example Operating Environment

FIG. 1 is an illustration of an environment 100 in an example implementation that is operable to employ techniques described herein. The illustrated environment 100 includes a client device 102 that is communicatively coupled via a network 104 to a service provider 106. The service provider 106 may be configured to make various resources 108 (e.g. content and services) available over the network 104 to the client device 102 and other clients. Generally, the resources 108 may include any suitable combination of services and/or content typically made available over a network by one or more providers. Some examples of services include, but are not limited to, a website, a search service, an email service, an instant messaging service, an online productivity suite, and an authentication service to control access of clients to the resources. Content may include various combinations of text, multi-media streams, documents, application files, photos, audio/video files animations, images, webpages, web applications, device applications, content for display by a browser or other client application, and so forth.

The client device 102 and the service provider 106 may be implemented by one or more computing devices and also may be representative of one or more entities. Further, the client device 102 may be configured in a variety of ways. For example, the client device 102 may be configured as a computer that is capable of communicating over the network, such as a desktop computer, tablet computer, a mobile station, an entertainment appliance, a set-top box communicatively coupled to a display device, a wireless phone, a game console, a docking station for a device, and so forth. Thus, the client device 102 may range from full resource devices with substantial memory and processor resources (e.g., personal computers, game consoles) to a low-resource device with limited memory and/or processing resources (e.g., traditional set-top boxes, hand-held game consoles). The client device 102 may also be implemented as a wearable apparatus that includes computing, data input and output functionality, and so forth.

The client device 102 is further illustrated as including an operating system 110, which is representative of functionality to abstract underlying functionality of hardware of the client device 102 to applications 112 that are executable on the client device 102. For example, the operating system 110 may abstract processing, memory, network, and/or display functionality to the applications 112.

The client device 102 is shown as being physically and communicatively coupled to an accessory device 114 via an interface 116. In at least some embodiments, the accessory device 114 is configured as a keyboard having a QWERTY arrangement of keys, although other arrangements of keys are also contemplated.

The interface 116 may be configured in various ways, such as a flexible hinge. A flexible hinge, however, is simply one illustrative example of the interface 116 that is suitable to connect and/or attach the accessory device 114 to the client device 102, and other types and implementations of the interface 116 may be employed in accordance with one or more embodiments.

In accordance with techniques described herein, the client device 102 is illustrated as being connectable to a power adapter 118, also referred to herein as a power supply unit (PSU). The power adapter 118 includes a connector 120 that connects to the client device 102 via a power input 122.

According to various implementations, the power input 122 serves as a physical interface between the power adapter 118 and the client device 102. Generally, the power adapter 118 is representative of a power supply unit that is connectable to a suitable AC power source and that can convert AC power into DC power that may be used for operation of the client device 102. For instance, the connector 120 may be detachably connected to the power input 122 (e.g., via magnetic force) to support mobile use of the client device 102 under battery power when detached, and battery charging/externally-powered use of the client device 102 when connected.

The power adapter 118 includes prongs 124 that may be plugged into a power source, such as an AC socket and/or other power supply. The prongs 124 may be implemented as pins, blades, and/or any other suitable electrically conductive protrusion. In at least some embodiments, the power adapter 118 is a two-prong adapter that may be plugged into a socket (e.g., a wall socket), such for receiving AC power at 120 volts, 220-240 volts, and so forth. For instance, the prongs 124 may represent an AC line voltage prong and an AC neutral prong. Further, the prongs may be foldable and/or retractable into a housing of the of the power adapter 118 when not in use to provide a more streamlined profile for storage and/or travel. Thus, in at least some implementations, the power adapter 118 does not include a ground prong, e.g., a third prong. This is not intended to be limiting, however, and in some alternative embodiments the power adapter 118 may include more than two prongs, such as a ground prong.

The power adapter 118 further includes a leakage reduction circuit 126 according to embodiments described herein that is configured to reduce high voltage leakage that may occur between an AC input portion and a DC output portion of the power adapter 118. Although the leakage reduction circuit 126 is illustrated as being positioned within and/or operably attached to the power adapter 118, this is not intended to be limiting. For instance, in at least some implementations, the leakage reduction circuit 126 may be positioned within and/or operably attached to the client device 102. Further details and implementations of the leakage reduction circuit 126 are presented below.

Figure 2:
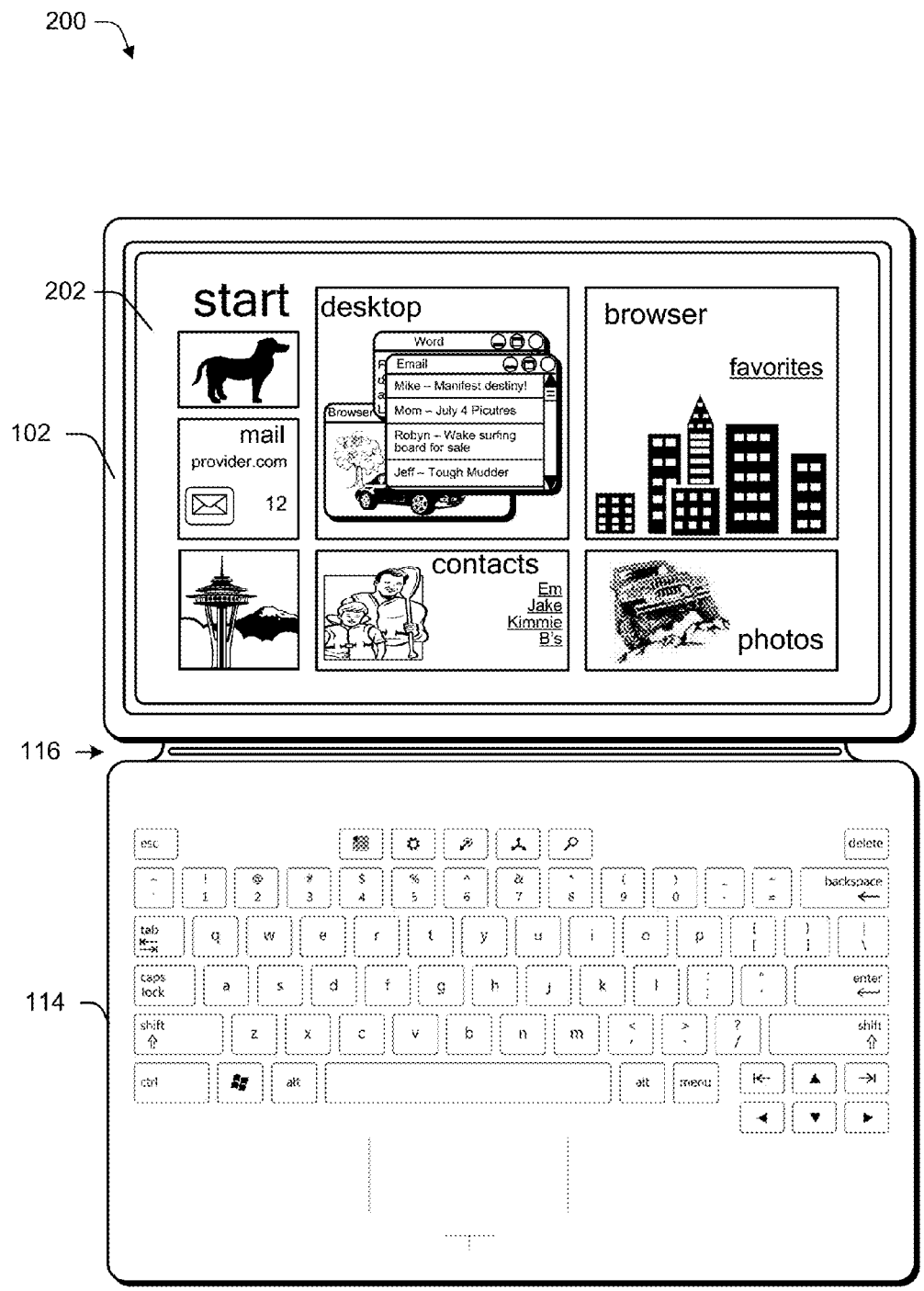
FIG. 2 is an illustration of an example client device in accordance with one or more implementations.

FIG. 2 depicts generally at 200 one illustrative example of the client device 102, including the accessory device 114 that is connectable to the client device 102 via the interface 116. In the example, the client device 102 is depicted as a tablet or slate device. The example accessory device 114 is configured as a keyboard having a QWERTY arrangement of keys although other arrangements of keys are also contemplated. Further, other non-conventional configurations for the accessory device 114 are also contemplated, such as a game controller, configuration to mimic a musical instrument, a power adapter, and so forth. Thus, the accessory device 114 may assume a variety of different configurations to support a variety of different functionality. Further, different accessory devices may be connected to the client device at different times.

The client device 102 further includes a display device 202 that is configured as an output device for presenting various types of visual information, such as text, graphics, video, animation, and so forth. The display device 202 may also be configured as a touchscreen that can receive a variety of different types of tactile input, such as touch input via a user's finger or other appendage, stylus input, pen input, and so forth. In at least some embodiments, the client device 102 may receive input via both the accessory device 114 and the display device 202, and/or may receive input via the display device 202 when the accessory device 114 is detached from the client device 102. As further detailed below, techniques for leakage reduction discussed herein may be employed to reduce leakage that may result in physically perceptible electrical current being felt by a user while in contact with electrically conductive portions of the client device 102 (e.g., metallic portions), such as when providing touch input to the display device 202 and/or the accessory device 114.

Having considered the foregoing discussion of an example operating environment and client device, consider now details regarding leakage reduction techniques in accordance with one or more implementations.

Leakage Reduction Circuit

This section discusses details of an example leakage reduction circuit in accordance with one or more implementations. In portions of the following discussion reference may be made to the example operating environment described in relation to FIGS. 1 and 2.

Figure 3:
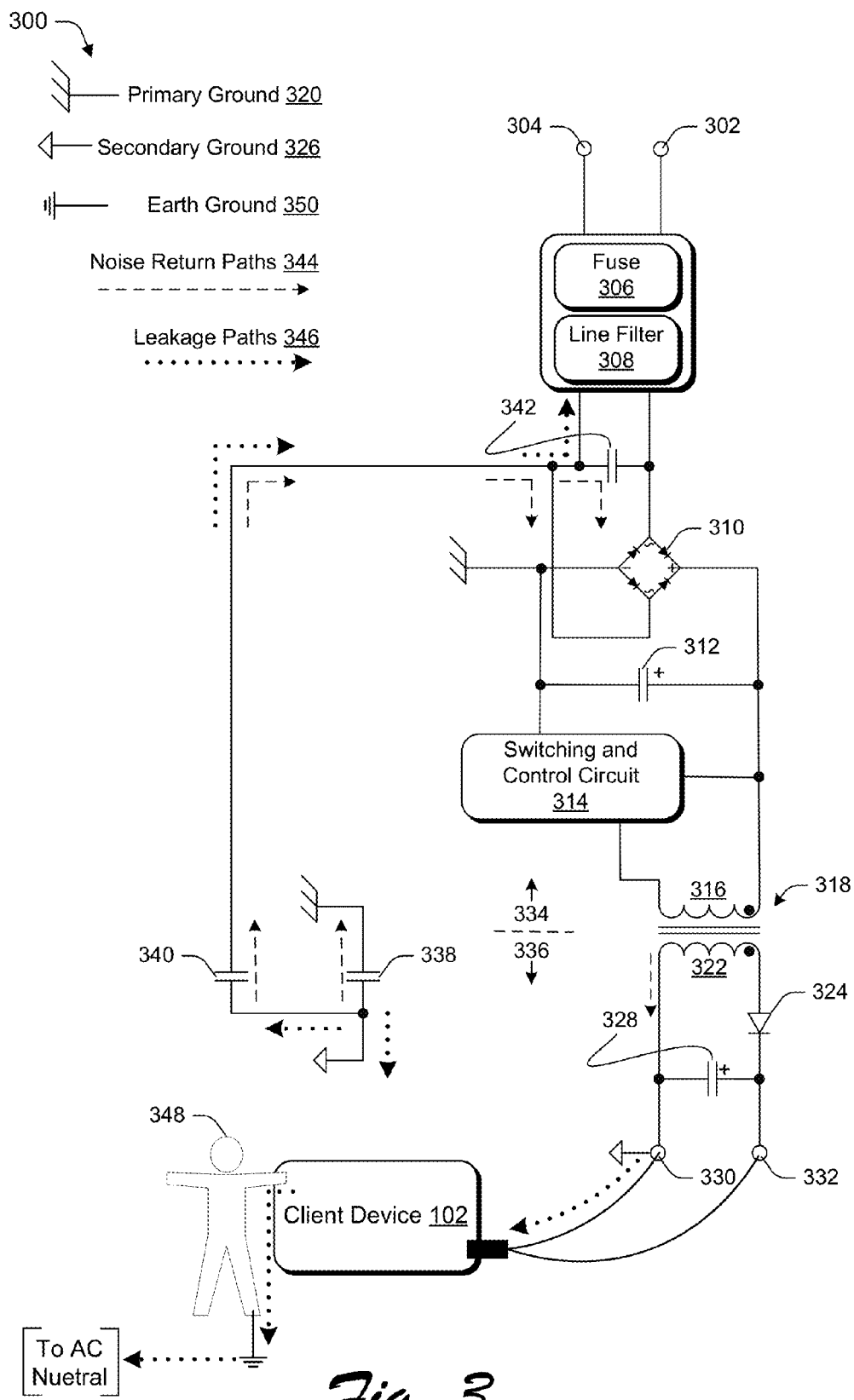
FIG. 3 is diagram depicting an example leakage reduction circuit in accordance with one or more implementations.

FIG. 3 depicts an example leakage reduction circuit 300 in accordance with one or more implementations. The leakage reduction circuit 300, for instance, represents an example implementation of the leakage reduction circuit 126, discussed above.

The leakage reduction circuit 300 includes an AC line input 302 and an AC neutral connection 304, which are operably connected to a fuse 306 and a line filter 308. The AC line input 302 and the AC neutral connection 304, for instance, may be operably connected to an AC line prong and an AC neutral prong, respectively, such as the prongs 124 discussed above. The outputs of the fuse 306 and the line filter 308 are operably connected to a bridge rectifier 310. Further, the positive output of the bridge rectifier 310 is operably connected to a positive pin of a bulk capacitor 312, to a switching and control circuit 314, and to a positive pin of a primary side 316 of a transformer 318.

The negative output of the bridge rectifier 310 is operably connected to a primary ground 320, which in turn is operably connected to a negative pin of the bulk capacitor 312 and the switching and control circuit 314. The switching and control circuit 314 is also operably connected to the negative side of the primary side 316 of the transformer 318. In at least some implementations, the switching and control circuit 314 may be operably connected to the AC line input 302 and/or a secondary portion of the leakage reduction circuit 300 (discussed below), such as for purpose of receiving and processing power system feedback. These particular connections are not specifically illustrated herein, but may be employed in one or more embodiments.

A positive portion of a secondary side 322 of the transformer 318 is operably connected to a cathode of a diode 324, and a negative side of the secondary side 322 of the transformer 318 is operably connected to a secondary ground 326. In turn, the secondary ground 326 is operably connected to a negative pin of an output capacitor 328 and a negative output (−V) 330 of the leakage reduction circuit 300. The anode of the diode 324 is operably connected to a positive pin of the output capacitor 328 and to a positive output (+V) 332 of the leakage reduction circuit 300. The negative output 330 and the positive output 332 are operably connectable to a device to provide DC power, e.g., via connection of the connector 120 to the power input 122 of the client device 102.

For purpose of illustration, the leakage reduction circuit 300 is generally considered to have a primary portion 334 and a secondary portion 336. The primary portion 334 represents high voltage portions of the circuit that include the AC line input 302 and an AC neutral connection 304, the primary side 316 of the transformer 318, and components in between. The secondary portion 336 represents lower voltage portions starting at the secondary side 322 of the transformer 318 and continuing to the negative output 330 and the positive output 332, including the secondary ground 326. During typical operation of the leakage reduction circuit 300, common mode noise (noise) may be generated, such as when the power adapter 118 is plugged in to an AC source and is connected to the client device 102 while the client device 102 is powered on. For instance, noise current generated by the primary portion 334 can be transferred to secondary portion 336 via transformer capacitance between windings of the primary side 316 and windings of the secondary side 322 of the transformer 318.

Noise that passes from the primary portion 334 to the secondary portion 336 and then on to a connected device can cause performance problems, such as radio frequency (RF) interference and performance degradation in device components, e.g., touch performance degradation of a touchscreen. Thus, the leakage reduction circuit 300 is configured to suppress noise that passes to the secondary portion 336 via a particular arrangement of capacitors. This arrangement of capacitors includes a first Y-capacitor 338, a second Y-capacitor 340, and an X-capacitor 342. These capacitors may be of various capacitance values. However, in at least one embodiment, the first Y-capacitor 338 and the second Y-capacitor 340 each have a capacitance value of 330 picofarads (pF), and the X-capacitor 342 has a value of 1 nanofarad (nF).

The first Y-capacitor 338 operably connects the secondary ground 326 to the primary ground 320, and the second Y-capacitor 340 operably connects the secondary ground 326 back to the AC neutral connection 304. Further, the X-capacitor 342 operably connects the AC neutral connection 304 to the AC line input 302. This arrangement of capacitors generates noise return paths 344 as generally shown via the dashed arrows. For instance, noise from the secondary portion 336 is returned from the secondary ground 326 to the primary ground 320 through the first Y-capacitor 338. Further, noise is returned from the secondary ground 326 to the AC neutral 304 through the second Y-capacitor 340. Noise is returned from the AC neutral 304 to the AC line input 302 through the X-capacitor 342.

This arrangement of capacitors not only suppresses noise in the secondary portion 336, but also reduces high voltage leakage that may pass from the primary portion 334 to the secondary portion 336 (e.g., across the transformer 318), and on to a connected device. An example of possible high voltage leakage paths 346 are shown via the dotted arrows. As illustrated, a portion of the high voltage leakage returns to AC neutral 304 via the Y-capacitor 340. Other portions of the high voltage leakage may pass from the DC output of the leakage reduction circuit 300 (e.g., output of the power adapter 118) into the client device 102. When a user 348 is in physical contact with electrically conductive portions of the client device 102 (e.g., a metallic housing or other metallic portion), high voltage leakage may pass from the client device 102 through the user 348 to earth ground 350. Generally, the earth ground 350 is connected to AC neutral (e.g., AC neutral 304) via a local grounding system.

According to various implementations, the amount of leakage allowed by the leakage reduction circuit 300 that passes through the user 348 is typically below electrical current levels that may be physically perceptible by the user 348 when in contact with the client device 102. Further, the amount of common mode noise levels are typically below noise levels that may adversely affect touchscreen functionality and/or other device componentry. For instance, leakage current measurements for a build of the leakage reduction circuit 300 in a 36 watt power supply unit showed leakage levels (e.g., across the leakage path from secondary ground to earth ground) of less than 20 microamperes when connected to a 230V AC power supply and with the polarity of the leakage reduction circuit 300 matched to the polarity of the AC power supply.

As illustrated, the leakage reduction circuit 300 does not include a Y-capacitor (Y-Line capacitor) connected between the secondary ground 326 and the AC line input 302. Some previous solutions for noise reduction circuitry, however, include a Y-capacitor connected between a secondary ground and an AC line input. When a Y-capacitor is connected between secondary ground and AC line input 302, the secondary ground 336 AC voltage is non-zero with respect to AC neutral 304. This typically causes high voltage leakage current in the secondary ground to increase because a Y-Line capacitor together with Y-capacitor 340 may act as an AC voltage divider. For example, if both Y capacitors have the same capacitance, the secondary ground is one half the input AC voltage. Such previous solutions typically experience significantly increased high voltage leakage into a connected device (e.g., 50 microamperes and higher) than the leakage reduction circuit 300. High voltage leakage levels at the levels seen in previous solutions (e.g., ≥50 microamperes) have been shown to be physically perceptible by users. As referenced above, the leakage reduction circuit 300 is configured to reduce high voltage leakage to levels significantly below those seen in previous solutions, thus reducing and/or eliminating physically perceptible voltage on a device, while reducing common mode noise interference with device componentry.

It is to be appreciated that the particular components included in the leakage reduction circuit 300 are presented for purpose of example only, and the techniques discussed herein can be employed to provide noise return paths and leakage reduction in a wide variety of different scenarios and different circuit configurations not specifically discussed herein in accordance with different embodiments.

Having considered an example leakage reduction circuit, consider now a discussion of an example system and device to implement various aspects in accordance with one or more embodiments.

Example System and Device

Figure 4:
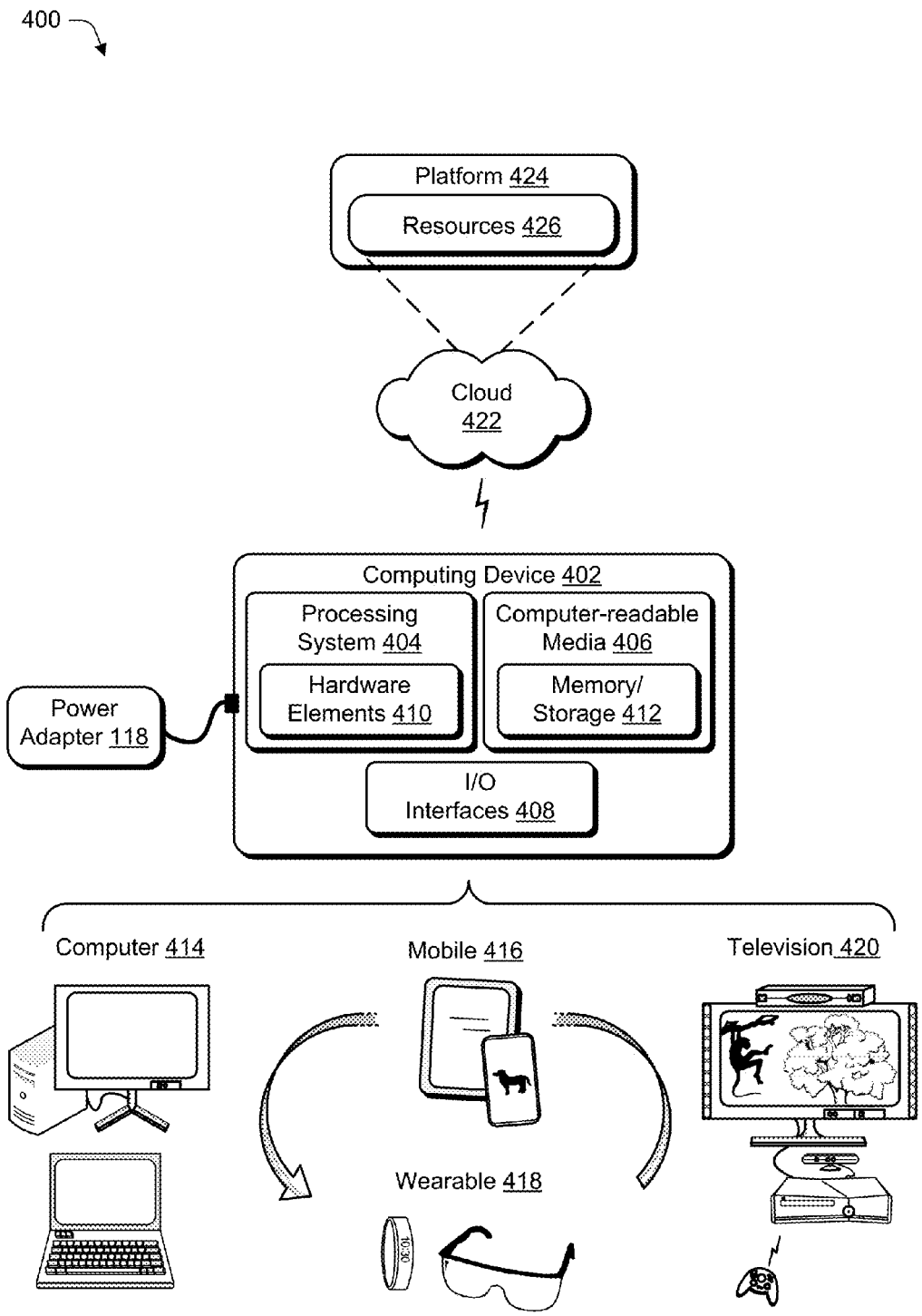
FIG. 4 depicts an example computing system and devices in accordance with one or more implementations.

FIG. 4 illustrates an example system 400 that includes an example computing device 402 that is representative of one or more computing systems and/or devices that may implement the various techniques described herein. The computing device 402 may be, for example, a server of a service provider, a device associated with a client (e.g., a client device), an on-chip system, and/or any other suitable computing device or computing system.

The example computing device 402 as illustrated includes a processing system 404, one or more computer-readable media 406, and one or more I/O interfaces 408 that are communicatively coupled, one to another. Although not shown, the computing device 402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 404 is representative of functionality to perform one or more operations using hardware. Accordingly, the processing system 404 is illustrated as including hardware elements 410 that may be configured as processors, functional blocks, and so forth. This may include implementation in hardware as an application specific integrated circuit or other logic device formed using one or more semiconductors. The hardware elements 410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 406 is illustrated as including memory/storage 412. The memory/storage 412 represents memory/storage capacity associated with one or more computer-readable media. The memory/storage 412 may include volatile media (such as random access memory (RAM)) and/or nonvolatile media (such as read only memory (ROM), Flash memory, optical disks, magnetic disks, and so forth). The memory/storage 412 may include fixed media (e.g., RAM, ROM, a fixed hard drive, and so on) as well as removable media (e.g., Flash memory, a removable hard drive, an optical disc, and so forth). The computer-readable media 406 may be configured in a variety of other ways as further described below.

Input/output interface(s) 408 are representative of functionality to allow a user to enter commands and information to computing device 402, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 402. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 402, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 410 and computer-readable media 406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable media described previously.

Combinations of the foregoing may also be employed to implement various techniques and modules described herein. Accordingly, software, hardware, or program modules including operating system 110, applications 112, and other program modules may be implemented as one or more instructions and/or logic embodied on some form of computer-readable storage media and/or by one or more hardware elements 410. The computing device 402 may be configured to implement particular instructions and/or functions corresponding to the software and/or hardware modules. Accordingly, implementation of modules as a module that is executable by the computing device 402 as software may be achieved at least partially in hardware, e.g., through use of computer-readable media and/or hardware elements 410 of the processing system. The instructions and/or functions may be executable/operable by one or more articles of manufacture (for example, one or more computing devices 402 and/or processing systems 404) to implement techniques, modules, and examples described herein.

As further illustrated in FIG. 4, the example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 402 may assume a variety of different configurations, such as for computer 414, mobile 416, wearable 418, and television 420 uses. Each of these configurations includes devices that may have generally different constructs and capabilities, and thus the computing device 402 may be configured according to one or more of the different device classes. For instance, the computing device 402 may be implemented as the computer 414 class of a device that includes a personal computer, desktop computer, a multi-screen computer, laptop computer, netbook, and so on.

The computing device 402 may also be implemented as the mobile 416 class of device that includes mobile devices, such as a mobile phone, portable music player, portable gaming device, a tablet computer, a multi-screen computer, and so on. The computing device 402 may also be implemented as the wearable 418 class of device that includes smaller devices that have input/output functionality and that are intended to be worn by a user. The computing device 402 may also be implemented as the television 420 class of device that includes devices having or connected to generally larger screens in casual viewing environments. These devices include televisions, set-top boxes, gaming consoles, and so on.

The techniques described herein may be supported by these various configurations of the computing device 402 and are not limited to the specific examples of the techniques described herein. The functionality of various modules may also be implemented all or in part through use of a distributed system, such as over a "cloud" 422 via a platform 424 as described below.

The cloud 422 includes and/or is representative of a platform 424 for resources 426. The platform 424 abstracts underlying functionality of hardware (e.g., servers) and software resources of the cloud 422. The resources 426 may include applications and/or data that can be utilized while computer processing is executed on servers that are remote from the computing device 402. Resources 426 can also include services provided over the Internet and/or through a subscriber network, such as a cellular or Wi-Fi network.

The platform 424 may abstract resources and functions to connect the computing device 402 with other computing devices. The platform 424 may also serve to abstract scaling of resources to provide a corresponding level of scale to encountered demand for the resources 426 that are implemented via the platform 424. Accordingly, in an interconnected device embodiment, implementation of functionality described herein may be distributed throughout the system 400. For example, the functionality may be implemented in part on the computing device 402 as well as via the platform 424 that abstracts the functionality of the cloud 422.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A power adapter comprising:
   a primary circuit portion configured to be connected to an alternating current (AC) power source;
   a secondary circuit portion operably connected to the primary circuit portion and configured to convert AC power received from the primary circuit portion into direct current (DC) power;
   a connector operably connected to the secondary circuit portion and connectable to a client device to provide DC power from the secondary circuit portion to the client device; and
   a leakage reduction circuit configured to provide a noise return path from the secondary circuit portion to the primary circuit portion and to reduce high voltage leakage from the primary circuit portion to the secondary circuit portion, the leakage reduction circuit including:
      a first Y-capacitor operably connected between a secondary ground of the secondary circuit portion and a primary ground of the primary circuit portion;
      a second Y-capacitor operably connected between the secondary ground of the secondary circuit portion and an AC neutral connection of the primary circuit portion, the second Y-capacitor setting an AC voltage on the secondary ground to zero with respect to the AC neutral connection, the first Y-capacitor and the second Y-capacitor having a same nominal capacitance value; and
      an X-capacitor operably connected between the AC neutral connection and an AC line input of the primary circuit portion.

2. The power adapter as described in claim 1, further comprising a line prong configured to connect the AC line input of the primary circuit portion to an AC line output of the AC power source, a neutral prong configured to connect the AC neutral connection of the primary circuit portion to an AC neutral line of the AC power source, and wherein the power adapter does not include a dedicated ground prong.

3. The power adapter as described in claim 1, wherein the first Y-capacitor and the second Y-capacitor each have a capacitance value of 330 picofarads.

4. The power adapter as described in claim 1, wherein:
   connection of the first Y-capacitor between the secondary ground of the secondary circuit portion and the primary ground of the primary circuit portion defines a first noise return path for the leakage reduction circuit;
   connection of the second Y-capacitor between the secondary ground of the secondary circuit portion and the AC neutral connection of the primary circuit portion defines a second noise return path for the leakage reduction circuit; and
   connection of the X-capacitor between the AC neutral connection and the AC line input of the primary circuit portion defines a third noise return path for the leakage reduction circuit.

5. The power adapter as described in claim 1, wherein the leakage reduction circuit does not include a Y-capacitor operably connected between the secondary ground and the AC line input.

6. The power adapter as described in claim 2, wherein the line prong and the neutral prong are one or more of foldable or retractable into a housing of the power adapter.

7. The power adapter as described in claim 3, wherein the X-capacitor has a capacitance value of 1 nanofarad.

8. A leakage reduction circuit for a power adapter comprising:
   a primary circuit portion configured to be connected to an alternating current (AC) power source;
   a secondary circuit portion operably connected to the primary circuit portion and configured to convert AC power received from the primary circuit portion into direct current (DC) power for output to a computing device;
   a first Y-capacitor operably connected between a secondary ground of the secondary circuit portion and a primary ground of the primary circuit portion;
   a second Y-capacitor operably connected between the secondary ground of the secondary circuit portion and an AC neutral connection of the primary circuit portion, the second Y-capacitor setting an AC voltage on the secondary ground to zero with respect to the AC neutral connection, the first Y-capacitor and the second Y-capacitor having a same nominal capacitance value; and
   an X-capacitor operably connected between the AC neutral connection and an AC line input of the primary circuit portion.

9. The leakage reduction circuit as described in claim 8, wherein the first Y-capacitor and the second Y-capacitor each have a capacitance value of 330 picofarads.

10. The leakage reduction circuit as described in claim 8, wherein:
    connection of the first Y-capacitor between the secondary ground of the secondary circuit portion and the primary ground of the primary circuit portion defines a first noise return path for the leakage reduction circuit;
    connection of the second Y-capacitor between the secondary ground of the secondary circuit portion and the AC neutral connection of the primary circuit portion defines a second noise return path for the leakage reduction circuit; and
    connection of the X-capacitor between the AC neutral connection and the AC line input of the primary circuit portion defines a third noise return path for the leakage reduction circuit.

11. The leakage reduction circuit as described in claim 8, wherein the leakage reduction circuit does not include a Y-capacitor operably connected between the secondary ground and the AC line input.

12. The leakage reduction circuit as described in claim 8, wherein the primary circuit portion includes:
 a line prong operably connected to an AC line input of the primary circuit portion;
 a neutral prong operably connected to an AC neutral connection of the primary circuit portion, and
 wherein the power adapter does not include a dedicated ground prong.

13. The leakage reduction circuit as described in claim 12, wherein the line prong and the neutral prong are one or more of foldable or retractable into a housing of the power adapter.

14. A leakage reduction circuit for a power adapter comprising:
 a primary circuit portion configured to be connected to an alternating current (AC) power source;
 a secondary circuit portion operably connected to the primary circuit portion and configured to convert AC power received from the primary circuit portion into direct current (DC) power for output to a computing device;
 a plurality of noise return paths for returning noise from the secondary circuit portion to the primary circuit portion, the noise return paths including:
 a first noise return path including a first Y-capacitor operably connected between a secondary ground of the secondary circuit portion and a primary ground of the primary circuit portion;
 a second noise return path including a second Y-capacitor operably connected between the secondary ground of the secondary circuit portion and an AC neutral connection of the primary circuit portion, the second Y-capacitor setting an AC voltage on the secondary ground to zero with respect to the AC neutral connection, the first Y-capacitor and the second Y-capacitor having a same nominal capacitance value; and
 a third noise return path including an X-capacitor operably connected between the AC neutral connection and an AC line input of the primary circuit portion, the X-capacitor having a nominal capacitance value different than the same nominal capacitance value.

15. The leakage reduction circuit as described in claim 14, wherein the first Y-capacitor and the second Y-capacitor each have a capacitance value of 330 picofarads.

16. The leakage reduction circuit as described in claim 14, wherein the leakage reduction circuit does not include a Y-capacitor operably connected between the secondary ground and the AC line input.

17. The leakage reduction circuit as described in claim 14, wherein the primary circuit portion includes:
 a line prong operably connected to an AC line input of the primary circuit portion;
 a neutral prong operably connected to an AC neutral connection of the primary circuit portion, and
 wherein the power adapter does not include a dedicated ground prong.

18. The leakage reduction circuit as described in claim 8, wherein at least part of the leakage reduction circuit is positioned within a client device.

19. The leakage reduction circuit as described in claim 15, wherein the X-capacitor has a capacitance value of 1 nanofarad.

20. The leakage reduction circuit as described in claim 17, wherein the line prong and the neutral prong are one or more of foldable or retractable into a housing of the power adapter.

* * * * *